United States Patent
Kawai et al.

(10) Patent No.: US 11,494,165 B2
(45) Date of Patent: Nov. 8, 2022

(54) ARITHMETIC CIRCUIT FOR PERFORMING PRODUCT-SUM ARITHMETIC

(71) Applicants: NTT ELECTRONICS CORPORATION, Yokohama (JP); NIPPON TELEGRAPH AND TELEPHONE CORPORATION, Tokyo (JP)

(72) Inventors: Kenji Kawai, Tokyo (JP); Ryo Awata, Yokohama (JP); Kazuhito Takei, Yokohama (JP); Masaaki Iizuka, Yokohama (JP)

(73) Assignees: NTT ELECTRONICS CORPORATION, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 210 days.

(21) Appl. No.: 16/959,986

(22) PCT Filed: Dec. 18, 2018

(86) PCT No.: PCT/JP2018/046496
§ 371 (c)(1),
(2) Date: Jul. 2, 2020

(87) PCT Pub. No.: WO2019/135355
PCT Pub. Date: Jul. 11, 2019

(65) Prior Publication Data
US 2021/0064340 A1    Mar. 4, 2021

(30) Foreign Application Priority Data
Jan. 5, 2018    (JP) .............................. JP2018-000452

(51) Int. Cl.
 *G06F 7/544* (2006.01)
 *G06F 7/53* (2006.01)

(52) U.S. Cl.
 CPC .......... *G06F 7/5443* (2013.01); *G06F 7/5324* (2013.01)

(58) Field of Classification Search
 CPC ....... G06F 7/5443; G06F 17/10; G06F 7/5324
 See application file for complete search history.

(56) References Cited

U.S. PATENT DOCUMENTS

| 7,046,723 B2 * | 5/2006 | Schier | H03H 17/0226 |
| | | | 708/316 |
| 2005/0201457 A1 * | 9/2005 | Allred | H03H 21/0012 |
| | | | 375/232 |

(Continued)

FOREIGN PATENT DOCUMENTS

| JP | 2000-132539 A | 5/2000 |
| JP | 2004-171263 A | 6/2004 |

OTHER PUBLICATIONS

International Preliminary Report on Patentability received for PCT Patent Application No. PCT/JP2018/046496, dated Jul. 16, 2020, 17 pages (11 pages of English Translation and 6 pages of Original Document).

(Continued)

*Primary Examiner* — Matthew D Sandifer
(74) *Attorney, Agent, or Firm* — Womble Bond Dickinson (US) LLP

(57) ABSTRACT

An arithmetic circuit includes a LUT generation circuit (1) that, when coefficients c[n] (n=1, ..., N) are paired two by two, outputs a value calculated for each of the pairs, and distributed arithmetic circuits (2-m) that calculate values z[m] that are sums of products of data x[m, n] of a data set X[m] containing M pairs of data x[m, n] and the coefficients c[n], in parallel for each of the M pairs. The distributed (Continued)

arithmetic circuit (2-*m*) includes binomial distributed arithmetic circuits that, for each of the pairs, calculate sums of products of a value obtained by pairing N data x[m, n] corresponding to the circuit two by two and a value obtained by pairing the coefficients c[n] two by two, and a figure matching circuit that matches a number of decimal figures of the sums with a predetermined number of decimal figures.

8 Claims, 11 Drawing Sheets

(56) References Cited

U.S. PATENT DOCUMENTS

2021/0064342 A1* 3/2021 Kawai ................ G06F 9/30036
2022/0100472 A1* 3/2022 Kawai .................... G06F 7/485

OTHER PUBLICATIONS

International Search Report and Written Opinion received for PCT Patent Application No. PCT/JP2018/046496, dated Apr. 2, 2019, 19 pages (11 pages of English Translation and 8 pages of Original Document).

Yi et al., "Implementation Consideration of Linear-Phase Delay Digital Filter Using Distributed Arithmetic on FPGA", Joint research presentation of Tochigi and Gunma branches of the Institute of Electrical Engineers of Japan, Available Online at <URL:https://kobaweb.ei.st.gunma-u.ac.jp/news/pdf/2011/ETT-11-07ekijo.pdf>, Feb. 29, 2012, 26 pages of Original Document Only.

* cited by examiner

FIG.4

| $x[m,2 \times n'-1][l]$ | $x[m,2 \times n'][l]$ | LUT#m-n'-l |
|---|---|---|
| 0 | 0 | 0 |
| 1 | 0 | $c[2 \times n'-1]$ |
| 0 | 1 | $c[2 \times n']$ |
| 1 | 1 | $d[n']$ |

FIG.9

| x_real[m][l] | x_imag[m][l] | OUTPUT OF REAL PART CALCULATION LUT INDEXING CIRCUIT | OUTPUT OF IMAGINARY PART CALCULATION LUT INDEXING CIRCUIT |
|---|---|---|---|
| 0 | 0 | 0 | 0 |
| 1 | 0 | c_real | c_imag |
| 0 | 1 | - c_imag | c_real |
| 1 | 1 | d_sub | d_add |

ARITHMETIC CIRCUIT FOR PERFORMING PRODUCT-SUM ARITHMETIC

TECHNICAL FIELD

The present invention relates to an arithmetic circuit for digital signal processing and, more particularly, to an arithmetic circuit for performing product-sum arithmetic.

BACKGROUND ART

Main arithmetic in digital signal processing is product-sum arithmetic that multiplies digital signal data expressed as a fixed-point binary number by a coefficient also expressed as a fixed-point binary number, and sums up the products (see non-patent literature 1). FIG. 11 shows the arrangement of a general product-sum arithmetic circuit.

This product-sum arithmetic circuit shown in FIG. 11 receives N data x[n] (n=1, ..., N) each of which is expressed by a binary number and a coefficient [n] (n=1, ..., N). Each data x[n] is a fixed-point binary number, and the number of decimal figures (the bit width after the decimal point) is x_scale. Also, each coefficient c[n] is a fixed-point binary number, and the number of decimal figures is c_scale.

This product-sum arithmetic circuit includes N multiplication circuits 1000-$n$ (n=1, ..., N). Each multiplication circuit 1000-$n$ performs multiplication c[n]×x[n] of the data x[n] and the coefficient [n], and outputs a result w[n]. Since this multiplication is simple binary-number multiplication, the number of decimal figures when handling w[n] as a fixed-point number is x_scale+c_scale.

The product-sum arithmetic circuit also includes a summing circuit 1001. The summing circuit 1001 performs summation $\Sigma_{n=1,\ldots,N}(c[n] \times x[n])$ of w[n] (n=1, ..., N), and outputs a result y. Since this summation is a calculation of repeating simple binary-number addition, the number of decimal figures when handling y as a fixed-point number is x_scale+c_scale, like the number of decimal figures of w[n].

The product-sum arithmetic circuit further includes a figure matching circuit 1002. The figure matching circuit 1002 matches the number of decimal figures of y with a number z_scale of decimal figures of a fixed-point number z to be output from the product-sum arithmetic circuit, by rounding down or rounding off lower bits of y. The number z_scale of decimal figures is normally smaller than the number x_scale+c_scale of decimal figures of s. Accordingly, when performing the round-down process, the figure matching circuit 1002 outputs a value obtained by deleting (x_scale+c_scale−z_scale) lower bits of y. When performing the round-off process, the figure matching circuit 1002 outputs a value obtained by adding the most significant bit of the bits deleted by the abovementioned round-down process to the value left behind after the round-down process.

The reasons why the figure matching circuit 1002 performs the round-down process or the round-off process on the sum y obtained by the summing circuit 1001 will be explained below.

Generally, data and coefficients contain a noise component, and the ratio of this noise component to a signal component particularly increases in lower bits. Therefore, the ratio of the noise component is high in lower bits of the multiplication result of data and a coefficient. In particular, of the bits representing the multiplication result, bits lower than the number of decimal figures of the data or the number of decimal figures of the coefficient contain quantization noise.

Also, in digital signal processing, a value output from a given product-sum arithmetic circuit is input to another product-sum arithmetic circuit using another coefficient value. When performing product-sum arithmetic by multiple stages like this, if the number of figures of the output value becomes larger than that of the input value, the number of figures to be handled in a product-sum arithmetic circuit in the output stage increases, and this increases the circuit scale and the power consumption.

Furthermore, since a product-sum arithmetic circuit in the input stage multiplies data by a coefficient, the number of figures after the multiplication if the figure matching circuit 1002 does not reduce the number of figures becomes larger than the sum of the numbers of figures of the data and the coefficient. Therefore, in an arrangement in which a product-sum arithmetic circuit in the input stage outputs a value without reducing the number of figures and a product-sum arithmetic circuit in the output stage receives this value and performs an operation, the product-sum arithmetic circuit in the output stage largely increases the circuit scale and the power consumption compared to the product-sum arithmetic circuit in the input stage.

Accordingly, even when the product-sum arithmetic circuit in the output stage receives the value having the number of figures increased by the product-sum arithmetic circuit in the input stage and performs an operation, no significant result can be obtained from the arithmetic processing that processes lower bits in which the ratio of the noise component is high. In addition, the area of a circuit for performing the product-sum arithmetic processing in the output stage and the power consumed by the circuit largely increase due to the abovementioned increase in number of figures. This wastefully largely increases the circuit area and the power consumption.

In the product-sum arithmetic circuit shown in FIG. 11, therefore, the figure matching circuit 1002 deletes lower bits having a large noise component, and limitedly outputs a significant bit width to the output stage, thereby reducing the cost (the area and the power consumption) of the circuit in the output stage.

As described above, to reduce the circuit scale and the power consumption, the conventional product-sum arithmetic circuit performs the process of deleting lower bits having a large noise component from the output value. However, the internal multiplication circuit 1000-$n$ itself performs an accurate multiplication process regardless of whether a bit has a large noise component. Therefore, a lower bit accurately calculated by the multiplication circuit 1000-$n$ in the conventional product-sum arithmetic circuit is deleted as a bit having a large noise component by the figure matching circuit 1002.

The multiplication circuit 1000-$n$ largely increases the circuit scale and the power consumption with respect to an increase in number of figures (in a balanced-tree type multiplication circuit, this increase is proportional to the square of the number of figures). Consequently, an increase in number of figures increases the number of elements and the power consumption, but a lower bit accurately calculated by the multiplication circuit 1000-$n$ in the conventional product-sum arithmetic circuit is deleted as a bit having a large noise component by the figure matching circuit 1002.

Accordingly, the multiplication circuit 1000-$n$ used in the conventional product-sum arithmetic circuit includes a circuit for accurately calculating a lower bit value that is invalidated by the figure matching circuit 1002 because the noise component is large, so the area of this circuit for accurately calculating a lower bit value and the power consumed by the circuit are wasted. Especially when increasing the number of figures of data or the number of figures of a coefficient in order to improve the accuracy of a digital signal processing system, the circuit scale and the power consumption wastefully increase.

RELATED ART LITERATURE

Patent Literature

Non-Patent Literature 1: Ru Yi, Takenori Tateiwa, Koji Asami, Haruo Kobayashi, "Implementation Consideration of Linear-Phase Delay Digital Filter Using Distributed Arithmetic on FPGA", The 2nd IEEJ, Tokyo branch, Tochigi branch/Gunma branch, Joint Forum, 2012

DISCLOSURE OF INVENTION

Problem to be Solved by the Invention

The present invention has been made to solve the above problems, and has as its object to provide an arithmetic circuit capable of reducing the circuit area and the power consumption.

Means of Solution to the Problem

The present invention is an arithmetic circuit that receives a data set $X[m]$ ($m=1, \ldots, M$) containing M (M is an integer of 2 or more) pairs of N (N is an integer of 2 or more) data $x[m, n]$ ($n=1, \ldots, N$) as fixed-point binary numbers, and N coefficients $c[n]$ as fixed-point binary numbers, and calculates and outputs M product-sum arithmetic values $z[m]$, including a LUT generation circuit configured to, when the N coefficients $c[n]$ are paired two by two, output a value calculated for each of the pairs, and M distributed arithmetic circuits configured to calculate and output, in parallel for each of the M pairs, the product-sum arithmetic values $z[m]$ as a result of multiplying the N data $x[m, n]$ of the data set $X[m]$ by the N coefficients $c[n]$ and summing up the products, wherein each of the distributed arithmetic circuits includes a plurality of binomial distributed arithmetic circuits configured to calculate and output, based on a value obtained by pairing the N data $x[m, n]$ corresponding to the circuit two by two, on a value obtained by pairing the N coefficients $c[n]$ two by two, and on the value calculated by the LUT generation circuit, a value of binomial product-sum arithmetic that multiplies the two data $x[m, n]$ by the two coefficients $c[n]$ and sums up the products, in parallel for each of the pairs, a first summing circuit configured to sum up the values calculated by the plurality of binomial distributed arithmetic circuits, and a figure matching circuit configured to perform a process of matching the number of decimal figures as a result of the summation by the first summing circuit with a predetermined number of decimal figures smaller than the above number of decimal figures, and outputs the processing result as the product-sum arithmetic values $z[m]$, each of the plurality of binomial distributed arithmetic circuits includes a plurality of indexing circuits formed for each bit position of two values of the same pair of the N data $x[m, n]$, and configured to obtain, for each bit position, one element value corresponding to two values in the same bit position, which form two values of the same pair of the N data $x[m, n]$, from element values including 0, two values of the same pair of the N coefficients $c[n]$, and a value calculated from the two values of the coefficient $[n]$ by the LUT generation circuit, a plurality of bit-position-basis arithmetic circuits configured to perform bit-position-basis arithmetic on the element values obtained by the plurality of indexing circuits, and a second summing circuit configured to output a result of summing up the values calculated by the plurality of bit-position-basis arithmetic circuits, as the binomial product-sum arithmetic value, and a bit-position-basis arithmetic circuit for which a bit position 1 corresponding to the circuit is smaller than a predetermined value Lc (Lc is an integer from 2 (inclusive) to L (exclusive)), among the plurality of bit-position-basis arithmetic circuits, invalidates (Lc−1) bits on a least significant bit side of an element value obtained by the indexing circuit corresponding to the circuit.

Also, the present invention is an arithmetic circuit that receives M (M is an integer of 2 or more) complex numbers $X[m]$ ($m=1, \ldots, M$) each of which is divided into a real part value $x\_real[m]$ and an imaginary part value $x\_imag[m]$ ($m=1, \ldots, M$), and a complex number coefficient C divided into a real part value $c\_real$ and an imaginary part value $c\_imag$, and calculates and outputs M complex number values $Z[m]$ containing a result of real part product-sum arithmetic and a result of imaginary part product-sum arithmetic, including a LUT generation circuit configured to calculate a value $d\_sub$ of a difference between the real part value $c\_real$ and the imaginary part value $c\_imag$ of the complex number coefficient C, and a value $d\_add$ of a sum of the real part value $c\_real$ and the imaginary part value $c\_imag$, M distributed arithmetic circuits configured to calculate and output, in parallel for each of M, a complex number value $Y[m]$ as a result of multiplying each of data, which correspond to the circuit, of the complex numbers $X[m]$ by the complex number coefficient C, and summing up the products, and M figure matching circuits configured to perform a process of matching each of the number of decimal figures of a real part product-sum arithmetic result $y\_real[m]$ and the number of decimal figures of an imaginary part product-sum arithmetic result $y\_imag[m]$, of the complex number values $Y[m]$ output from the M distributed arithmetic circuits, with a predetermined number of decimal figures smaller than these numbers of decimal figures, and output the results of the process as $z\_real[m]$ and $z\_imag[m]$ forming the complex number values $Z[m]$, wherein each of the distributed arithmetic circuits includes a plurality of first indexing circuits formed for each bit position of the real part value $x\_real[m]$ and the imaginary part value $[m]$ of the complex number $X[m]$, and configured to obtain, for each bit position, one element value corresponding to two values, in a bit position corresponding to the circuit, of the real part value $x\_real[m]$ and the imaginary part value $x\_imag[m]$, from element values including 0, $c\_real$, $-c\_imag$, and $d\_sub$, a plurality of first bit-position-basis arithmetic circuits configured to perform bit-position-basis arithmetic on the element values obtained by the plurality of first indexing circuits, a first summing circuit configured to output a result of summing up the values calculated by the plurality of first bit-position-basis arithmetic circuits, as the real part product-sum arithmetic value $y\_real[m]$, a plurality of second indexing circuits formed for each bit position of the real part value $x\_real[m]$ and the imaginary part value $[m]$ of the complex number $X[m]$, and configured to obtain, for each bit position, one element value corresponding to two values, in a bit position corresponding to the circuit, of the real part value $x\_real[m]$ and the imaginary part value $x\_imag[m]$, from element values including 0, $c\_imag$, $c\_real$, and $d\_add$, a plurality of second bit-position-basis arithmetic circuits configured to perform bit-position-basis arithmetic on the element values obtained by the plurality of second indexing circuits, and a second summing circuit configured to output a result of summing up the values calculated by the plurality of second bit-position-basis arithmetic circuits, as the imaginary part product-sum arithmetic value y_imag[m], the arithmetic circuit calculates and outputs, in parallel for each of M, y_real[m] as a result of product-sum arithmetic c_real×x_real[m]−c_imag×x_imag[m] of the real part, and y_imag[m] as a result of product-sum arithmetic c_imag×x_real[m]+c_real×x_imag[m] of the imaginary part, and among the plurality of first and second bit-position-basis arithmetic circuits, a bit-position-basis arithmetic circuit for which a bit position l corresponding to the circuit is smaller than a predetermined value Lc (Lc is an integer from 2 (inclusive) to L (exclusive)) invalidates (Lc−1) bits on a least significant bit side of the element values obtained by the first and second indexing circuits corresponding to the circuit.

Effect of the Invention

The arithmetic circuit of the present invention adopts distributed arithmetic that searches a LUT for each bit position of data and accumulates element values, instead of a multiplication circuit that performs accurate multiplication on all bits without distinguishing between upper bits and lower bits, thereby making it possible to reduce a circuit for processing corresponding to a lower bit predesignated for each bit position. This reduced circuit is a useless circuit for calculating a lower bit value that is invalidated by the figure matching circuit because the noise component is large. The present invention can effectively reduce the area and the power of the abovementioned useless circuit.

BRIEF DESCRIPTION OF DRAWINGS

FIG. 4 is a view for explaining the operation of a LUT indexing circuit according to the first embodiment of the present invention;

FIG. 9 is a view for explaining the operations of a real part LUT indexing circuit and an imaginary part LUT indexing circuit according to the second embodiment of the present invention;

BEST MODE FOR CARRYING OUT THE INVENTION

First Embodiment

Figure 1:
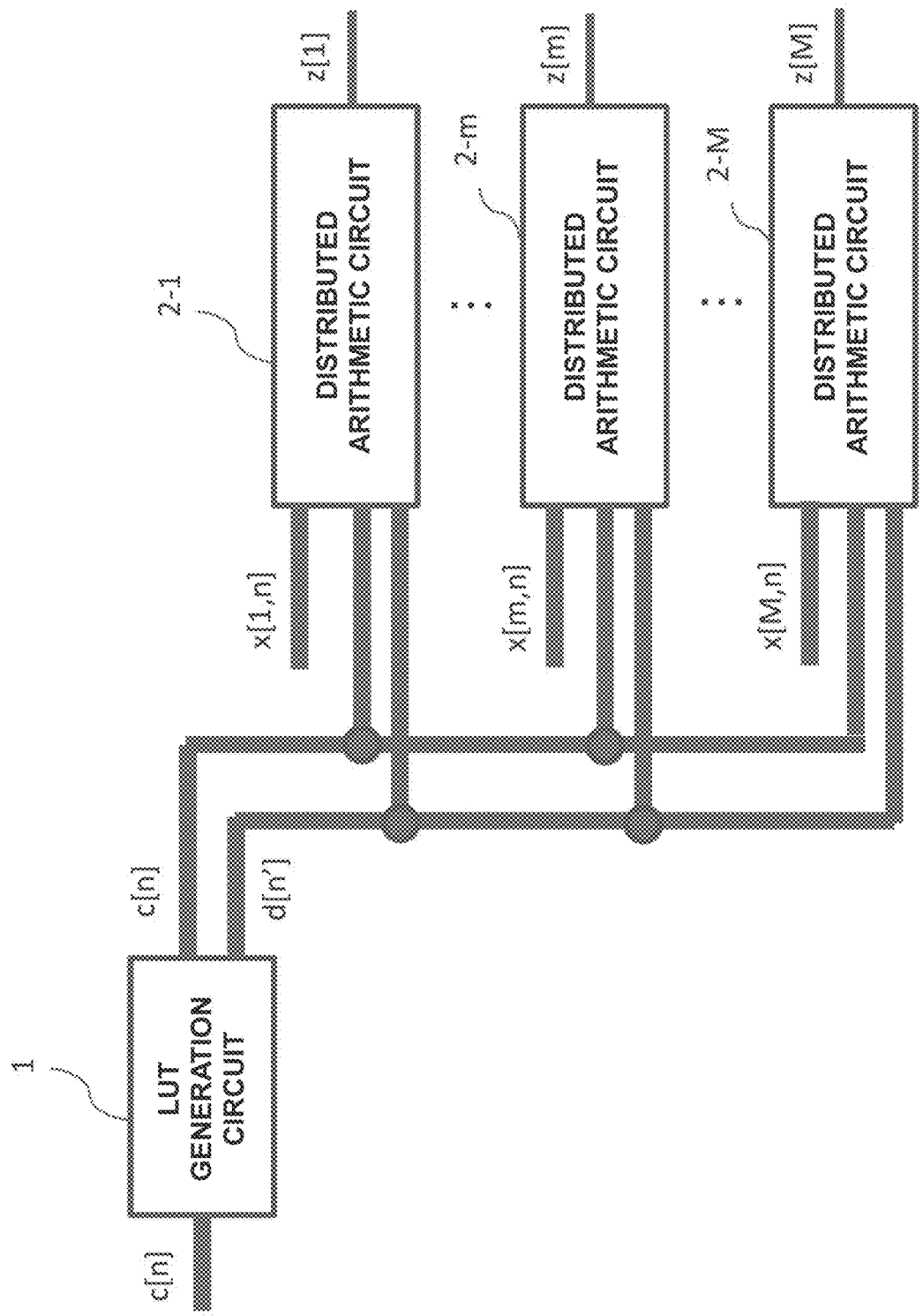
FIG. 1 is a block diagram showing the arrangement of an arithmetic circuit according to the first embodiment of the present invention.

Embodiments of the present invention will be explained below with reference to the accompanying drawings. FIG. 1 is a block diagram showing the arrangement of an arithmetic circuit according to the first embodiment of the present invention. The arithmetic circuit of this embodiment receives M (M is an integer of 2 or more) data sets X[m] (m=M) and N (N is an integer of 2 or more) coefficients c[n] (n=N). Each data set X[m] (m=M) includes N data x[m, n] (m=N). Note that each of the data x[m, n] and the coefficient [n] is a two's-complement binary number expressing a signed fixed-point number. Let x_scale be the number of decimal figures of each data x[m, n], and c_scale be the number of decimal figures of each coefficient c[n].

The arithmetic circuit shown in FIG. 1 calculates and outputs M product-sum arithmetic values z[m] (m=M) with respect to the abovementioned inputs. Each of the product-sum arithmetic values z[m] (m=M) output from the arithmetic circuit is a value limited to a significant bit width by deleting lower bits having a large noise component from a result obtained by multiplying each of the N data x[m, n] (n=1, . . . , N) forming the data set X[m] (m=M) by the coefficient c[n] and summing up the products, i.e., a result equivalent to $\Sigma_{n=1, \ldots, N}$ (c [n]×x[m, n]). Note that the product-sum arithmetic values z[m] is a two's-complement binary number expressing a signed fixed-point number, and the number of decimal figures is z_scale.

The arithmetic circuit shown in FIG. 1 includes one LUT generation circuit 1 and M (M is an integer of 2 or more) distributed arithmetic circuits 2-1 to 2-M.

The LUT generation circuit 1 receives the N coefficients c[n] (n=1, . . . , N) as the coefficients of product-sum arithmetic, and calculates values to be used as elements of a distributed arithmetic LUT from the values of pairs obtained by pairing the N coefficients c[n] (n=1, . . . , N) two by two. Then, the LUT generation circuit 1 distributes the calculated values together with the coefficients c[n] to the distributed arithmetic circuits 2-1 to 2-M.

The method of pairing the coefficients c[n] (n=1, . . . , N) must be the same as the pairing of c[p] and c[q] in a binomial product-sum arithmetic calculation c[p]×x[m, p]+c[q]×x[m, q] (each of p and q is an integer within the range of 1 to N, and p≠q) according to the distributed arithmetic, which is performed in each of the distributed arithmetic circuits 2-m (m=1, . . . , M), as described later.

In this embodiment, a method of pairing the coefficients c[n] such that odd-numbered values having consecutive ordinal numbers are paired with immediately succeeding even-numbered values will be explained. In the pairing of this embodiment, therefore, c[2×n'−1] and c[2×n'] (n'=1, . . . , N', N' is a maximum integer that is N/2 or less) belong to the same pair, like c[1] and c[2], c[3] and c[4], . . . . The value of N' is N/2 when N is an even number, and is (N−1)/2 when N is an odd number.

Note that the present invention is not limited to this pairing method, and the method of pairing the coefficients c[n] need only be the same as the pairing method in binomial product-sum arithmetic based on distributed arithmetic, which is performed in each of the distributed arithmetic circuits 2-m (m=1, . . . , M).

The LUT generation circuit 1 calculates the sum of the values c[2×n'−1] and c[2×n'] (n'=1, . . . , N') obtained by pairing the coefficients c[n] (n=1, . . . , N), i.e., calculates c[2×n'−1]+c[2×n'] as d[n'], and outputs the coefficients c[n] (n=1, . . . , N) and the calculated value d[n'] (n'=1, . . . , N') to the respective distributed arithmetic circuits 2-1 to 2-M.

Note that the present invention is not limited to the above calculation, and it is only necessary to use a calculation for generating elements of the distributed arithmetic LUT to be used in each the distributed arithmetic circuits 2-m (m=1, . . . , M). Note also that the value d[n'] calculated by the LUT generation circuit 1 is a two's-complement binary number expressing a signed fixed-point number.

Each of the distributed arithmetic circuits 2-m (m=1, . . . , M) receives the data set X[m] including the N data x[m, n] (n=M), the coefficients c[n] (n=N) distributed from the LUT generation circuit 1, and the value d[n'] (n'=N') calculated by the LUT generation circuit 1, and outputs a value obtained by multiplying each of the N data x[m, n], which correspond to the circuit, of the data set X[m] by the coefficient c[n] and summing up the products, i.e., outputs a value y[m] equivalent to $\Sigma_{n=1, \ldots, N}(c[n] \times x[m, n])$.

Figure 2:
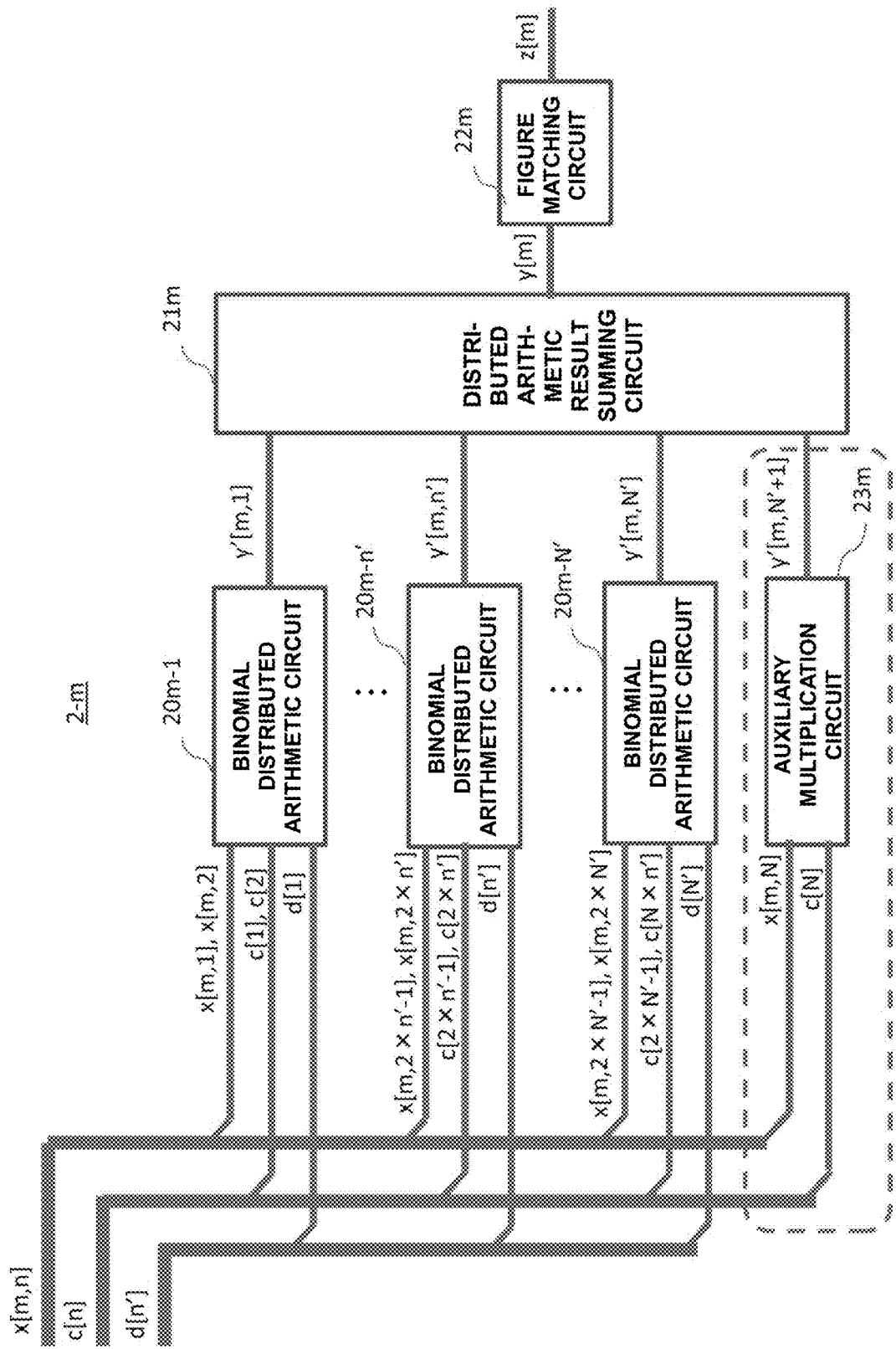
FIG. 2 is a block diagram showing the arrangement of a distributed arithmetic circuit according to the first embodiment of the present invention.

FIG. 2 shows the arrangement of the distributed arithmetic circuit 2-m (m=M). Each distributed arithmetic circuit 2-m includes N' binomial distributed arithmetic circuits 20m-n' (n'=N'), a binomial distributed arithmetic result summing circuit 21m, and a figure matching circuit 22m.

The distributed arithmetic circuit 2-m shown in FIG. 2 pairs the N data x[m, n], which correspond to the circuit, of the input data set X[m], in the same manner as the pairing performed on the coefficients c[n] (n=N) by the LUT generation circuit 1.

The LUT generation circuit 1 of this embodiment pairs the coefficients c[n] (n=N) so that the values of odd numbers having consecutive ordinal numbers are paired with the values of immediately succeeding even numbers. Accordingly, x[m, 2×n'−1] and x[m, 2×n'] (n'=N', N' is a maximum integer that is N/2 or less) are paired in the pairing performed on the N data x[m, n] by each of the distributed arithmetic circuits 2-m as well.

Each of the binomial distributed arithmetic circuits 20m-n' (n'=N') receives a pair of data x[m, 2×n'−1] and x[m, 2×n'] corresponding to the circuit, a pair of coefficients c[2×n'−1] and c[2×n'], which correspond to the circuit, of the coefficients c[n] (n=N), and the value d[n'] calculated by the LUT generation circuit 1.

A binomial distributed arithmetic circuit 20m-n' forms a LUT having 0, c[2×n'−1], c[2×n'], and d[n'] as the numerical values of elements, obtains the result of product-sum arithmetic c[2×n'−1]×x[m, 2×n'−1]+c[2n']×x[m, 2×n'] by distributed arithmetic using the LUT, and outputs the result as y'[m, n']. Note that the result y'[m, n'] of the product-sum arithmetic is a two's-complement binary number expressing a signed fixed-point number.

The binomial distributed arithmetic result summing circuit 21m sums up the values y'[m, n'] output from the binomial distributed arithmetic circuits 20m-n', i.e., calculates $\Sigma_{n=1, \ldots, N'}(y'[m, n'])$, and outputs the result as y[m].

Note that the above explanation of the distributed arithmetic circuits 2-m is a case in which N is an even number. When N is an odd number, as shown in FIG. 2, an auxiliary multiplication circuit 23m that calculates c[N]×x[m, N] and outputs the result as y'[m, N'+1] is added.

In addition, when N is an odd number, the binomial distributed arithmetic result summing circuit 21m sums up the values y'[m, n'] (n'=1, . . . , N') output from the binomial distributed arithmetic circuits 20m-n' (n'=1, . . . , N') and the value y'[m, N'+1] output from the auxiliary multiplication circuit 23m, and outputs the result as y[m].

The figure matching circuit 22m performs a process of rounding down or rounding off lower bits of the product-sum arithmetic result y[m] output from the distributed arithmetic result summing circuit 21m, thereby matching the number of decimal figures of y[m] with the number z_scale of decimal figures of a fixed-point number to be output from the arithmetic circuit, and outputs the processing result as z[m]. The value of z_scale is smaller than the number y_scale of decimal figures of y[m].

Accordingly, when performing the round-down process, the figure matching circuit 22m outputs a value obtained by deleting (y_scale−z_scale) lower bits of y[m]. Also, when performing the round-off process, the figure matching circuit 22m outputs a value obtained by adding the most significant bit of the bits deleted by the abovementioned round-down process to the value left behind after the round-down process.

Figure 3:
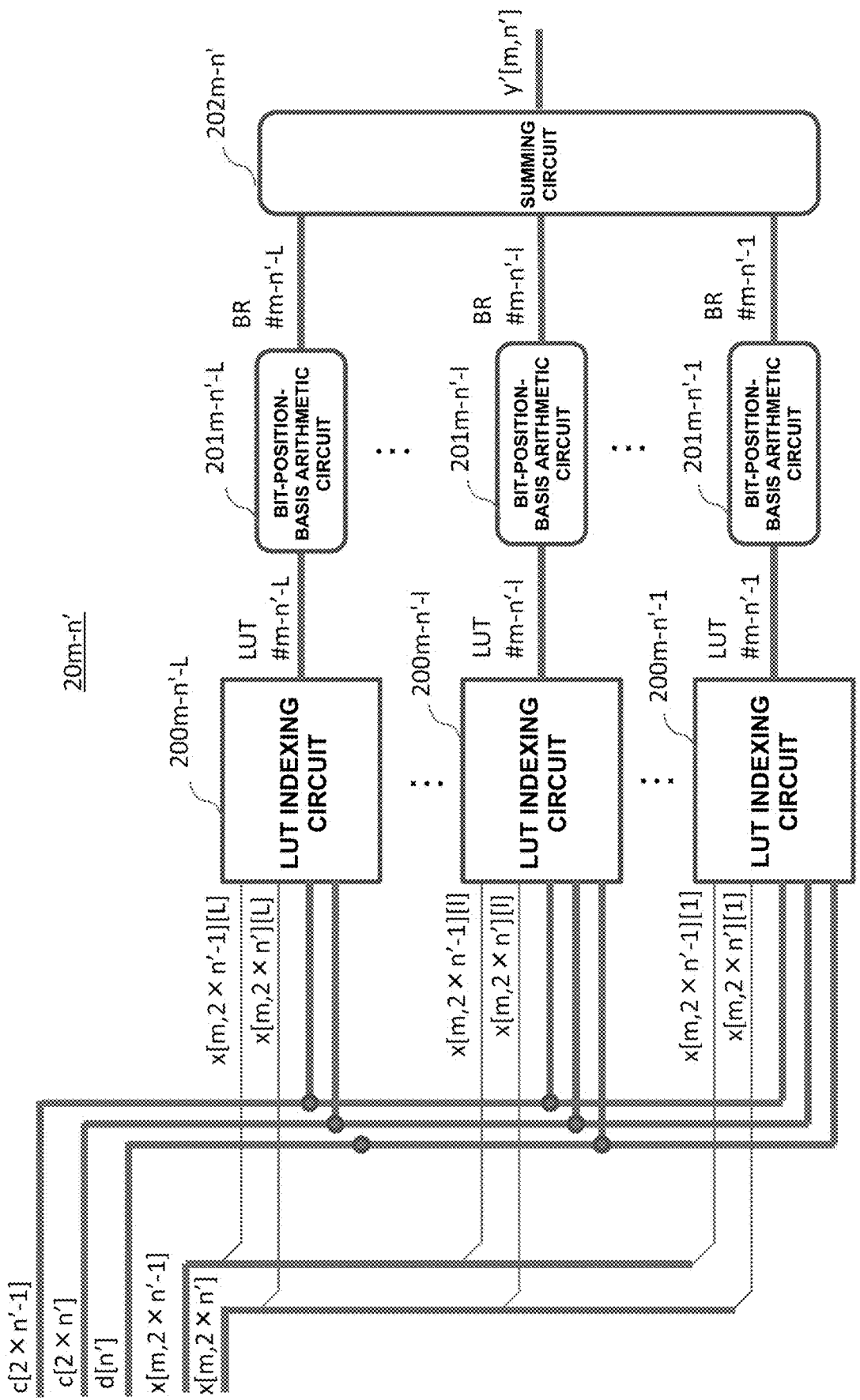
FIG. 3 is a block diagram showing the arrangement of a binomial distributed arithmetic circuit according to the first embodiment of the present invention.

FIG. 3 shows the arrangement of a binomial distributed arithmetic circuit 20m-n' (m=1, . . . , M, n'=1, . . . , N'). Let L be the bit width of one of given data x[m, n] (m=1, . . . , M, n=1, . . . , N), x[m, 2×n'−1][l] (l=1, . . . , L) be each bit of the data x[m, 2×n'−1] as an input to the binomial distributed arithmetic circuit 20m-n', and x[m, 2×n'][l] (l=1, . . . , L) be each bit of x[m, 2×n'].

The binomial distributed arithmetic circuit 20m-n' shown in FIG. 3 includes L LUT indexing circuits 200m-n'-l (selection circuits), L bit-position-basis arithmetic circuits 201m-n'-l, and a summing circuit 202m-n'.

The binomial distributed arithmetic circuit 20m-n' includes the LUT indexing circuit 200m-n'-l formed for each bit position l (l=1, . . . , L) of the data x[m, 2×n'−1] and x[m, 2×n']. The LUT indexing circuit 200m-n'-l selects one of four elements of the LUT based on the bits x[m, 2×n'−1][l] and x[m, 2×n'][l], in the bit position l corresponding to the circuit, of the data x[m, 2×n'−1] and x[m, 2×n'], and obtains the selected element value as LUT #m−n'−l. Note that LUT #m−n'−l is a two's-complement binary number expressing a signed fixed-point number.

FIG. 4 shows the relationship between each value of the bits x[m, 2×n'−1] [l] and x[m, 2×n'] and the selected element value LUT #m−n'−l of the LUT. This relationship between each value of the bits x[m, 2×n'−1][l] and x[m, 2×n'] and the element value LUT #m−n'—l is the same as the relationship between addresses and stored values in a LUT when performing general binomial product-sum arithmetic by using distributed arithmetic. The value of LUT #m−n'−l is (c[2× n'−1]×[m, 2×n'−1] [l]+c[2×n']×x[m, 2×n'] [l]).

In the binomial distributed arithmetic circuit 20m-n' shown in FIG. 3, the bit-position-basis arithmetic circuit 201m-n'-l performs bit-position-basis arithmetic on each of the element values LUT #m−n'−l of the LUT selected by the LUT indexing circuit 200m-n'-l for each bit position l (l=1, . . . , L).

The summing circuit 202m-n' outputs, as y'[m, n'], a result of summing up a bit-position-basis arithmetic result BR #m−n'−l calculated by the L bit-position-basis arithmetic circuits 201m-n'-l, i.e., $\Sigma_{l=1, \ldots, L}(BR \#m-n'-l)$. The concept of the arithmetic of the binomial distributed arithmetic circuit 20m-n' will be explained with reference to FIG. 5.

When the bit position l corresponding to the bit-position-basis arithmetic circuit 201m-n'-l is larger than Lc (Lc is an integer from 2 (inclusive) to L (exclusive)) (l=Lc+1, . . . , L), the bit-position-basis arithmetic circuit 201m-n'-l outputs, as the bit-position-basis arithmetic result BR #m−n'−l, a result of shifting the element value LUT #m–n'–l selected by the LUT indexing circuit 200m-n'-l corresponding to the circuit to the left by (l–Lc) bits.

Figure 5:
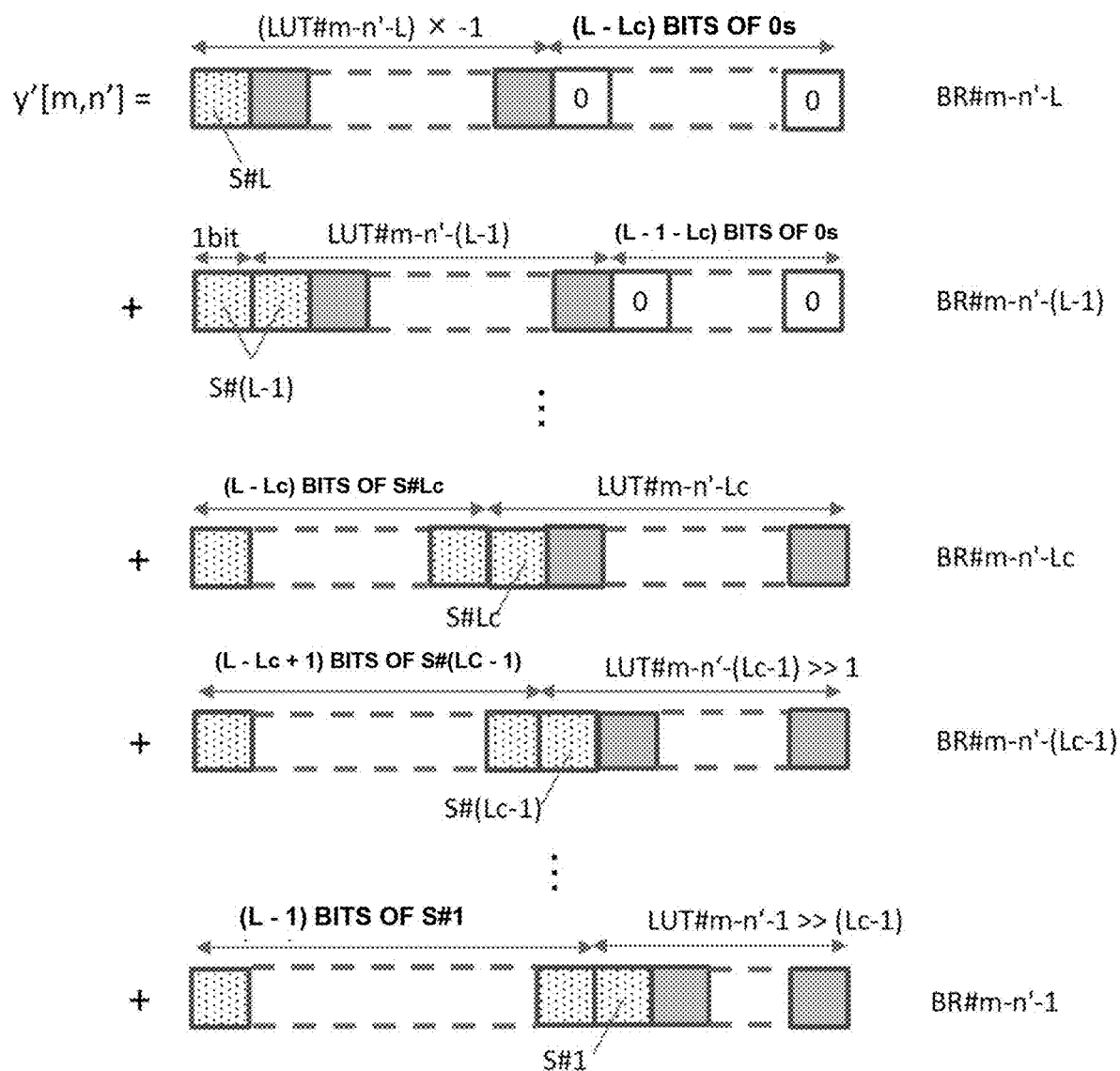
FIG. 5 is a view for explaining the concept of the arithmetic of the binomial distributed arithmetic circuit according to the first embodiment of the present invention.

This left shift operation is equal to multiplying the element value LUT #m–n'–l by $2^{(l-Lc)}$ and (l–Lc) bit values to be added to the LSB by the left shift operation are 0s. FIG. 5 shows an example of the bit-position-basis arithmetic result BR #m–n'–(L–1) when the bit position l is larger than Lc.

Note that the bit-position-basis arithmetic circuit 201m-n'-l corresponding to a bit position where l=L (the MSB position of data) outputs, as the bit-position-basis arithmetic result BR #m–n'–l, a result of the left-shifting by (L–Lc) bits for the inverting the sign of the element value LUTft-n'–L selected by the LUT indexing circuit 200m-n'-L.

Also, when the bit position l corresponding to the bit-position-basis arithmetic circuit 201m-n'-l is smaller than Lc (l=1, . . . , Lc–1), the bit-position-basis arithmetic circuit 201m-n'-l outputs, as the bit-position-basis arithmetic result BR #m–n'–l, a result of shifting the element value LUT #m–n'–l selected by the LUT indexing circuit 200m-n'-l corresponding to the circuit to the right by (Lc–l) bits.

This right shift operation is equivalent to dividing the element value LUT #m–n'–l by $2^{(Lc-l)}$ and (Lc–l) bit values on the LSB side before the right shift operation are not held by the circuit but are invalidated after the right shift operation. The process of this right shift operation is equal to rounding down the (Lc–l) bits on the LSB side of the element value LUT #m–n'–l. FIG. 5 shows examples of the bit-position-basis arithmetic results BR #m–n'–(Lc–1) and BR #m–n'–l when the bit position l is smaller than Lc.

Furthermore, the bit-position-basis arithmetic circuit 201m-n'-l corresponding to a bit position where l=Lc performs no calculation on the element value LUT #m–n'–Lc selected by the LUT indexing circuit 200m-n'-l corresponding to the circuit, and directly outputs the element value LUT #m–n'–l as a bit-position-basis arithmetic result #m–n'–Lc.

As described above, in each element value LUT #m–n'–l (l=1, . . . , Lc–1) when the bit position l is smaller than Lc, the (Lc–l) bit values on the LSB side are invalidated by the (Lc–l)-bit right shift operation performed by the bit-position-basis arithmetic circuit 201m-n'-l. In addition, in order for the LUT indexing circuit 200m-n'-l to select one of four element values of the LUT, a 4:1 selector circuit for selecting one of four bit values is normally used for each bit position of the element value.

Accordingly, for the (Lc–l) bits on the LSB side, which are invalidated by the bit-position-basis arithmetic circuit 201m-n'-l, of the bits of the element value LUT #m–n'–l, the circuit scale of the LUT indexing circuit 200m-n'-l can be reduced by omitting the abovementioned 4:1 selector circuit.

The summing circuit 202m-n' sums up the bit-position-basis arithmetic results BR #m–n'–l output from the bit-position-basis arithmetic circuits 201m-n'-l, and outputs a sum $\Sigma_{l=1, \ldots, L}$(BR #m–n'–l) as the abovementioned y'[m, n'].

In this embodiment, the left shift operation or the right shift operation is performed by the number of bits that changes in accordance with the bit position l, so the bit-position-basis arithmetic results BR #m–n'–l have different bit widths. Therefore, the summing circuit 202m-n' matches the bit widths of the bit-position-basis arithmetic results BR #m–n'–l to BR #m–n'–(L–1) with the maximum bit width, i.e., the bit width of the bit-position-basis arithmetic result BR #m–n'–L, and then sums up the bit-position-basis arithmetic results BR #m–n'–l (l=1, . . . , L).

Each bit-position-basis arithmetic result BR #m–n'–l is a two's-complement binary number expressing a signed fixed-point number. In the abovementioned bit width matching, therefore, a bit having the same value as that of a sign bit S #1 must be added to the MSB side.

Note that when the bit-position-basis arithmetic circuit 201m-n'-l performs the (Lc–l)-bit right shift operation on the element value LUT #m–n'–l if the bit position l is smaller than Lc (l=1, . . . , Lc–1), it is also possible to add the value of 1 bit on the MSB side, of the (Lc–1) bits on the LSB side to be invalidated, to the result of the right shift operation, thereby obtaining the bit-position-basis arithmetic result BR #m–n'–l. This processing is equal to rounding off the (Lc–l) bits on the LSB side of the element value LUT #m–n'–l.

The value y'[m, n'] output from each binomial distributed arithmetic circuit 20m-n' is the result of product-sum arithmetic for the data x[m, n] and the coefficient c[n]. The number of decimal figures when the result of product-sum arithmetic is obtained by the conventional technique (arithmetic combining multiplication and addition) is the sum of the number x_scale of decimal figures of the data x[m, n] and the number c_scale of decimal figures of the coefficient c[n], i.e., x_scale+c_scale. The number of decimal figures of the result of product-sum arithmetic is also x_scale+c_scale when product-sum arithmetic is performed by normal distributed arithmetic (equivalent to a case in which the value of the parameter Lc is 1 in this embodiment).

Figure 6:
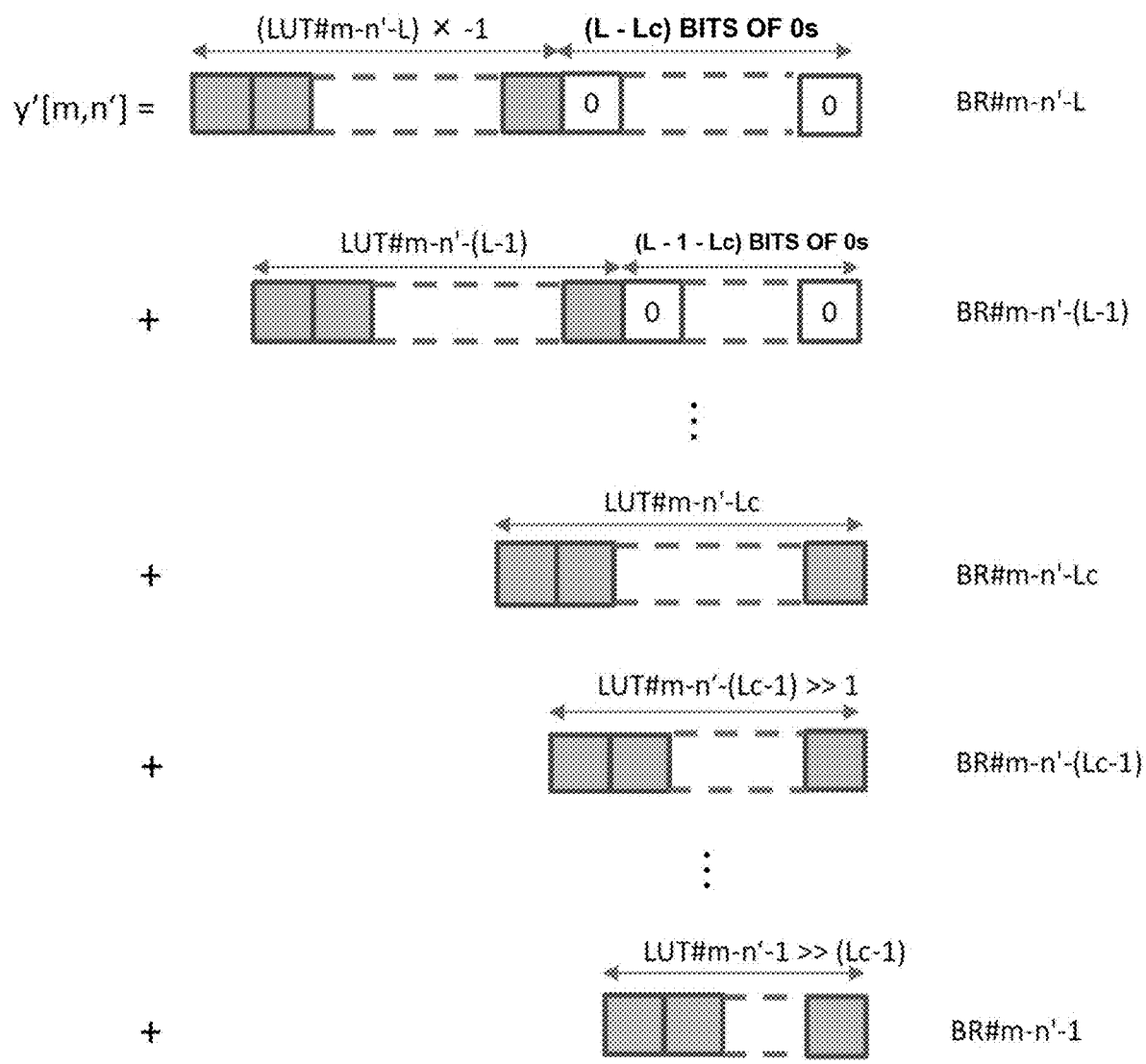
FIG. 6 is a view for explaining the concept of the arithmetic of the binomial distributed arithmetic circuit according to the first embodiment of the present invention.

On the other hand, in this embodiment, (Lc–1) lower bits are invalidated as shown in FIG. 6. Therefore, the number y' scale of decimal figures of the value y'[m, n'] output from each binomial distributed arithmetic circuit 20m-n' is shortened by the number of invalidated bits, and hence becomes x_scale+c_scale–Lc+1.

As described above, the arithmetic circuit of this embodiment is not a multiplication circuit that performs accurate multiplication on all bits, but performs distributed arithmetic that obtains the element value LUT #m–n'–l from the LUT for each bit position l of data, invalidates lower bits of the element value LUT #m–n'–l, which are predesignated in accordance with the bit position l, i.e., invalidates (Lc–l) lower bits in this embodiment, and accumulates the values.

Consequently, this embodiment requires no accumulation process for the invalidated bits when compared to the conventional arithmetic circuit that performs no invalidation, and can reduce the circuit area and the power consumption accordingly. Also, the invalidated lower bits contain a large noise component. Therefore, the lower bit invalidation of this embodiment does not degrade the accuracy of the value to be output from the arithmetic circuit, because the figure matching circuit 22m performs the round-off process or the round-down process in the conventional arithmetic circuit as well.

That is, the arithmetic circuit of this embodiment is not a multiplication circuit that performs accurate multiplication on all bits without distinguishing between upper bits and lower bits, but adopts distributed arithmetic that obtains the element value LUT #m–n'–l from the LUT for each bit position l of data and accumulates the values, thereby omitting the processing of lower bits predesignated for each bit position l. Accordingly, the arithmetic circuit of this embodiment can effectively reduce the area and power of the circuit without deteriorating the arithmetic accuracy.

In particular, in order to increase the processing speed, the arithmetic circuit of this embodiment performs parallelization corresponding to the data bit width in order to simultaneously perform LUT search and accumulation for each bit position l of data in the distributed arithmetic circuits, and parallelization corresponding to the number of distributed arithmetic circuits in order to simultaneously perform distributed arithmetics on the M data sets. In the arithmetic circuit of this embodiment, therefore, the circuit scale required for the process of accumulating the abovementioned invalidated bits increases. This increases the effect of reducing the circuits by omitting the processing for the lower bits.

Second Embodiment

Figure 7:
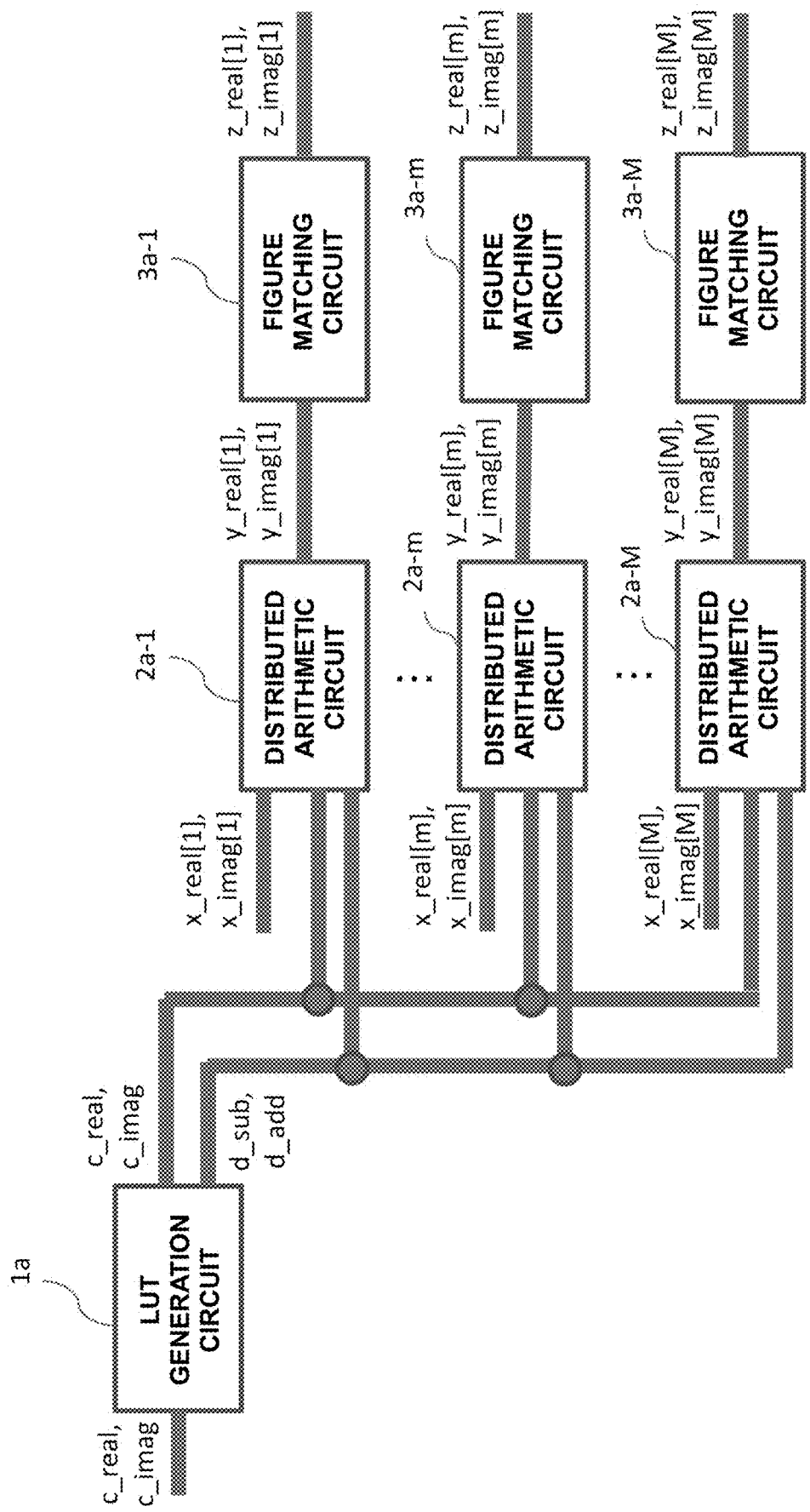
FIG. 7 is a block diagram showing the arrangement of an arithmetic circuit according to the second embodiment of the present invention.

The second embodiment of the present invention will be explained below. FIG. 7 is a block diagram showing the arrangement of an arithmetic circuit according to the second embodiment of the present invention. This arithmetic circuit shown in FIG. 7 receives M (M is an integer of 2 or more) complex numbers X[m] (m=1, . . . , M) each of which is divided into a real part value x_real[m] and an imaginary part value x_imag[m] (m=1, . . . , M), and a complex number coefficient C divided into a real part value c_real and an imaginary part value c_imag. Note that data x[m, n] (m=1, . . . , M, n=1, . . . , N) is a signed numerical value (a numerical value expressed by a two's-complement binary number) that can take a negative value. Let x_scale be the number of decimal figures of the real part value x_real[m] and the imaginary part value x_imag[m] of each complex number X[m] (m=1, . . . , M), and c_scale be the number of decimal figures of the real part value c_real and the imaginary part value c_imag of the complex number coefficient C.

Also, let L be the bit width of one of arbitrary data x_real[m] (m=1, . . . , M) and x_imag[m] (m=1, . . . , M) expressed by binary numbers, x_real[m][l] (l=1, . . . , L) be each bit of data x_real[m] to be input to a distributed arithmetic circuit $2a$-$m$ (to be described later), and x_imag[m][l] (l=1, . . . , L) be each bit of x_imag[m].

From the abovementioned inputs, the arithmetic circuit shown in FIG. 7 obtains M complex number values Z[m] (m=1, . . . , M) each of which is divided into a real part value z_real[m] and an imaginary part value z_imag[m] (m=1, . . . , M) by distributed arithmetic, and outputs the obtained values. Each of the M complex number values Z[m] is equivalent to (C×X[m]). That is, the real part value z_real[m] is equivalent to c_real×x_real[m]−c_imag×x_imag[m]. The imaginary part value z_imag[m] is equivalent to c_imag×x_real[m]+c_real×x_imag[m].

Note that each of the real part value z_real[m] and the imaginary part value z_imag[m] is a value limited to a significant bit width by deleting lower bits having a large noise component from the product of the complex number X[m] and the complex number coefficient C. That is, the z_real[m] does not always completely match c_real×x_real[m]−c_imag×x_imag[m]. Likewise, the imaginary part value z_imag[m] does not always completely match c_imag×x_real[m]+c_real×x_imag[m]. Note also that each of the real part value z_real[m] and the imaginary part value z_imag[m] is a two's-complement binary number expressing a signed fixed-point number, and the number of decimal figures is z_scale.

The arithmetic circuit shown in FIG. 7 includes one LUT generation circuit $1a$, M (M is an integer of 2 or more) distributed arithmetic circuits $2a$-$1$ to $2a$-M, and M figure matching circuits $3a$-$1$ to $3a$-M.

The LUT generation circuit $1a$ receives the real part value c_real and the imaginary part value c_imag of the complex number coefficient C, calculates a value d_sub equivalent to a difference c_real−c_imag between the real part value c_real and the imaginary part value c_imag, and a value d_add equivalent to a sum c_real+c_imag of the real part value c_real and the imaginary part value c_imag, and outputs the values d_sub and d_add together with the real part value c_real and the imaginary part value c_imag to the distributed arithmetic circuits $2a$-$1$ to $2a$-M.

Each of the distributed arithmetic circuits $2a$-$m$ (m=1, . . . , M) receives the complex number X[m] (m=1, . . . , M), and the real part value c_real, the imaginary part value c_imag, and the values d_sub and d_add distributed from the LUT generation circuit $1a$, and calculates and outputs, in parallel for each of M, complex number values Y[m] (m=1, . . . , M) obtained by multiplying data, which corresponds to the circuit, of the complex numbers X[m] by the complex number coefficient C, and summing up the products.

The distributed arithmetic circuit $2a$-$m$ forms a real part LUT having 0, c_real, −c_imag, and d_sub as the numerical values of elements, and an imaginary part LUT having 0, c_imag, c_real, and d_add as the values of elements, obtains the result of real part product-sum arithmetic c_real×x_real[m]−c_imag×x_imag[m] by distributed arithmetic using the real part LUT, and outputs the result as y_real[m]. In addition, the distributed arithmetic circuit $2a$-$m$ obtains the result of imaginary part product-sum arithmetic c_imag×x_real[m]+c_real×x_imag[m] by distributed arithmetic using the imaginary part LUT, and outputs the result as y_imag[m].

The figure matching circuit $3a$-$m$ performs a process of rounding down or rounding off lower bits of the result y_real[m] of the real part product-sum arithmetic output from the distributed arithmetic circuit $2a$-$m$, thereby matching the number of decimal figures of y_real[m] with the number z_scale of decimal figures of a fixed-point number to be output from the arithmetic circuit, and outputs the processing result as z_real[m]. Similarly, the figure matching circuit $3a$-$m$ performs a process of rounding down or rounding off lower bits of the result y_imag[m] of the imaginary part product-sum arithmetic output from the distributed arithmetic circuit $2a$-$m$, thereby matching the number of decimal figures of y_imag[m] with the number z_scale of decimal figures of a fixed-point number to be output from the arithmetic circuit, and outputs the processing result as z_imag[m]. The value of z_scale is smaller than the number y_scale of decimal figures of y_real[m] or y_imag[m].

Accordingly, when performing the round-down process, the figure matching circuit $3a$-$m$ outputs values obtained by deleting (y_scale−z_scale) bits from y_real[m] and y_imag[m], as z_real[m] and z_imag[m], respectively. When performing the round-off process, the figure matching circuit $3a$-$m$ outputs a value obtained by adding the most significant bit of the bits deleted by the abovementioned round-down process to the value left behind after the round-down process.

Figure 8:
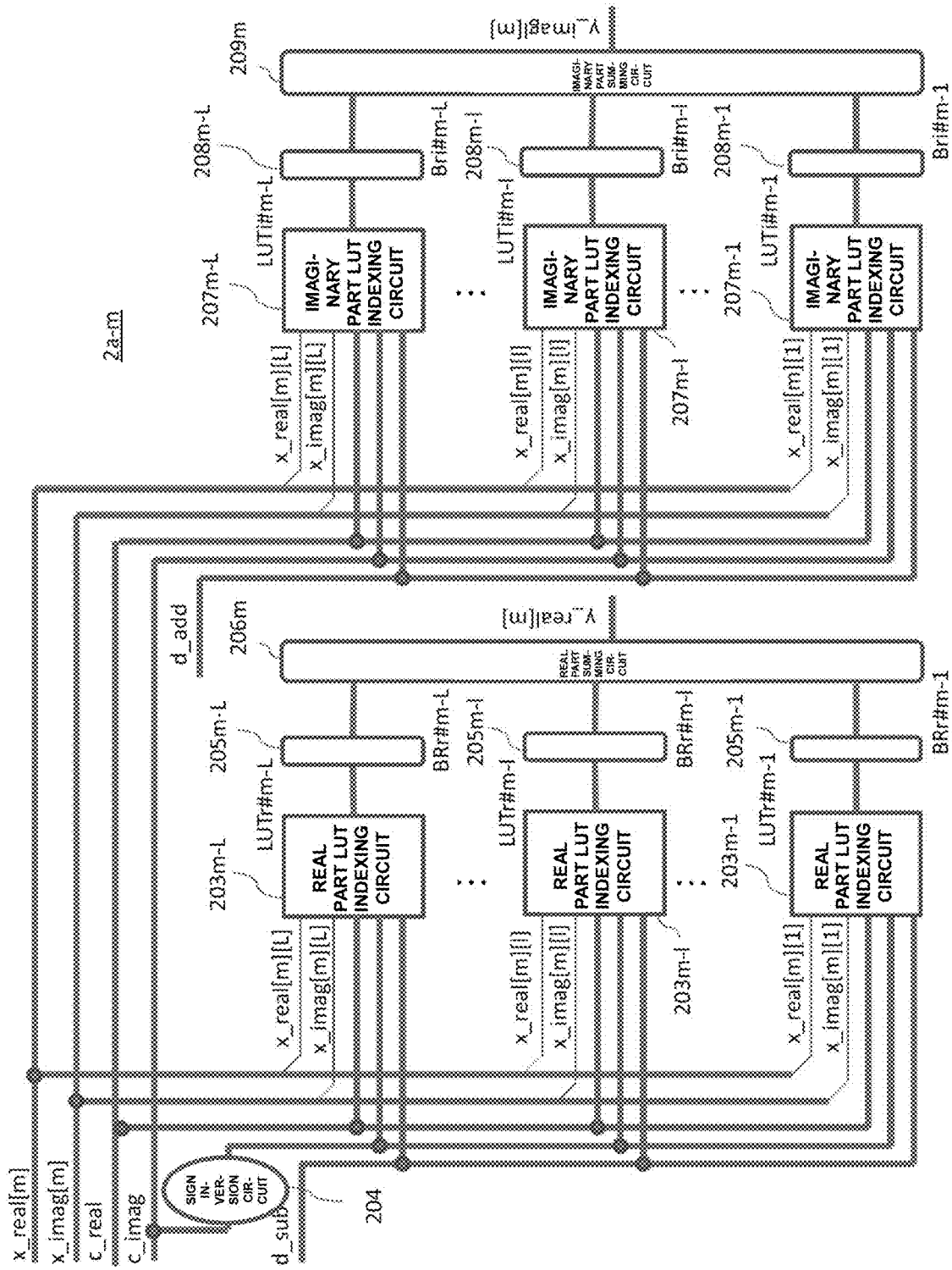
FIG. 8 is a block diagram showing the arrangement of a distributed arithmetic circuit according to the second embodiment of the present invention.

FIG. 8 shows the arrangement of the distributed arithmetic circuit $2a$-$m$ (m=1, . . . , M). The distributed arithmetic circuit $2a$-$m$ shown in FIG. 8 includes L real part LUT indexing circuits $203m$-$l$ (real part selection circuits), a sign inversion circuit 204, L real part bit-position-basis arithmetic circuits $205m$-$l$, a real part summing circuit $206m$, L imaginary part LUT indexing circuits $207m$-$l$ (imaginary part selection circuits), L imaginary part bit-position-basis arithmetic circuits $208m$-$l$, and an imaginary part summing circuit $209m$.

The distributed arithmetic circuit $2a$-$m$ includes the real part LUT indexing circuit $203m$-$l$ and the imaginary part LUT indexing circuit 207*m-l* formed for each bit position l (l=1, . . . , L) of the data x_real[m] and x_imag[m].

The real part LUT indexing circuit 203*m-l* selects one of four element values of the real part LUT, i.e., 0, c_real, −c_imag, and d_sub, based on bits x_real[m][l] and x_imag[m][l], in the bit position corresponding to the circuit, of the data x_real[m] and x_imag[m], and obtains the selected element value as LUTr #m-l. The element value LUTr #m-l is a two's-complement binary number expressing a signed fixed-point number.

The imaginary part LUT indexing circuit 207*m-l* selects one of four element values of the imaginary part LUT, i.e., 0, c_imag, c_real, and d_add, based on the bits x_real[m][l] and x_imag[m][l], in the bit position corresponding to the circuit, of the data x_real[m] and x_imag[m], and obtains the selected element value as LUTi #m-l. The element value LUTi #m-l is a two's-complement binary number expressing a signed fixed-point number.

FIG. 9 shows the relationship between the values of the bits x_real[m][l] and x_imag[m][l], and the selected element values of the real part LUT and the imaginary part LUT. This relationship between the values of the bits x_real[m][l] and x_imag[m][l] and the element values of the real part LUT and the imaginary part LUT is the same as the relationship between addresses and stored values in a LUT when performing general binomial product-sum arithmetic by using distributed arithmetic.

In the distributed arithmetic circuit 2*a-m* shown in FIG. 8, the real part bit-position-basis arithmetic circuit 205*m-l* performs bit-position-basis arithmetic on the element value LUTr #m-l of the LUT, which is selected for each bit position l (l=1, . . . , L by the real part LUT indexing circuit 203*m-l*. Similarly, the imaginary part bit-position-basis arithmetic circuit 208*m-l* performs bit-position-basis arithmetic on the element value LUTi #m-l of the LUT, which is selected for each bit position l by the imaginary part LUT indexing circuit 207*m-l*.

The real part summing circuit 206*m* outputs, as y_real[m], a result of summing up bit-position-basis arithmetic results BRr #m-l calculated by the L real part bit-position-basis arithmetic circuits 205*m-l*, i.e., $\Sigma_{l=1, \ldots, L}$(BRr #m-l). Likewise, the imaginary part summing circuit 209*m* outputs, as y_imag[m], a result of summing up the bit-position-basis arithmetic results BRi #m-l calculated by the L imaginary part bit-position-basis arithmetic circuits 208*m-l*, i.e., $\Sigma_{l=1, \ldots, L}$(BRi #m-l).

Figure 10:
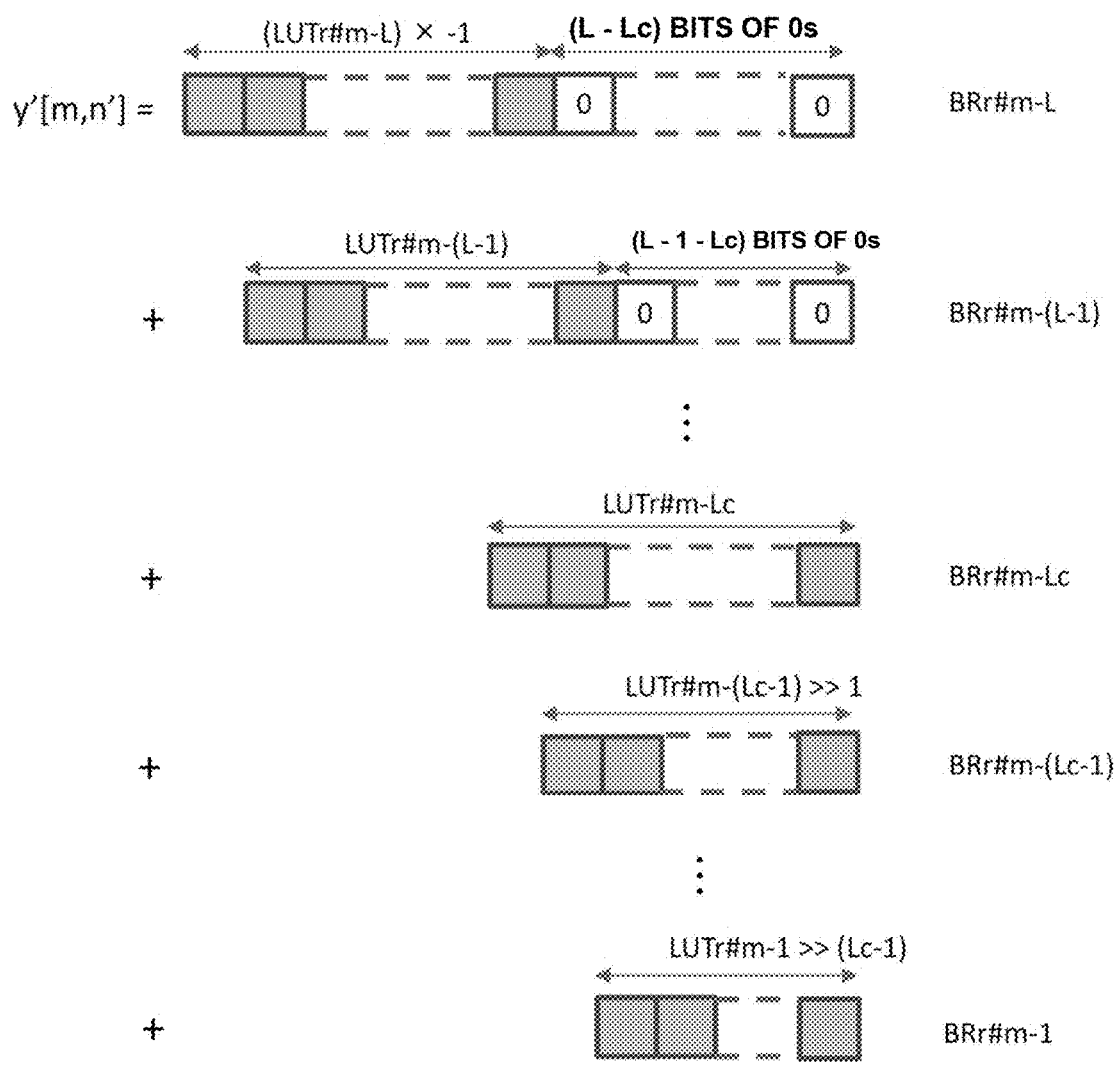
FIG. 10 is a view for explaining the concept of the arithmetic of the distributed arithmetic circuit according to the second embodiment of the present invention.
Figure 11:
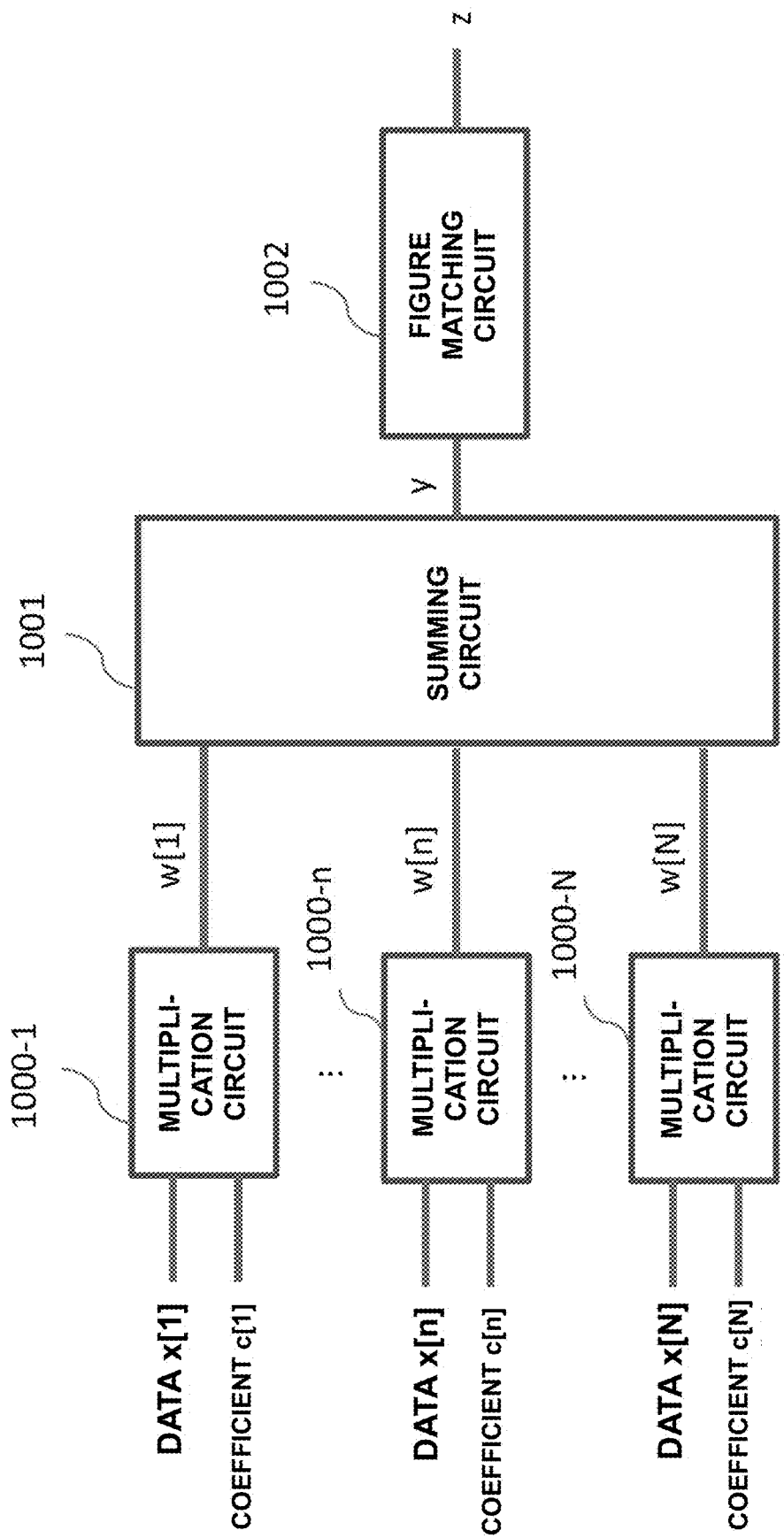
FIG. 11 is a block diagram showing the arrangement of a conventional product-sum arithmetic circuit.

FIG. 10 is a conceptual view for explaining the arithmetic of the distributed arithmetic circuit 2*a-m*. Note that the bit-position-basis arithmetic process and the summing process are common to the real part and the imaginary part, so FIG. 10 takes the bit-position-basis arithmetic process and the summing process for the real part as examples.

When the bit position l corresponding to the real part bit-position-basis arithmetic circuit 205*m-l* is larger than Lc (Lc is an integer from 2 (inclusive) to L (exclusive)) (l=Lc+L), the real part bit-position-basis arithmetic circuit 205*m-l* performs (l−Lc)-bit left shift operation on the element value LUTr #m-l selected for each bit position l by the real part LUT indexing circuit 203*m-l* corresponding to the circuit, and outputs the result as the real part bit-position-basis arithmetic result BRr #m-l. Similarly, when the bit position l corresponding to the imaginary part bit-position-basis arithmetic circuit 208*m-l* is larger than Lc, the imaginary part bit-position-basis arithmetic circuit 208*m-l* performs (l−Lc)-bit left shift operation on the element value LUTi #m-l selected for each bit position l by the imaginary part LUT indexing circuit 207*m-l* corresponding to the circuit, and outputs the result as the imaginary part bit-position-basis arithmetic result BRi #m-l.

These left shift operations are equal to multiplying the element values LUTr #m-l and LUTi #m-l by $2^{(l-Lc)}$ and the (l−Lc) bit values to be added to the LSB side by each left shift operation are 0s. FIG. 10 shows an example of the bit-position-basis arithmetic result BRr #m-(L−1) when the bit position l is larger than Lc.

Note that the real part bit-position-basis arithmetic circuit 205*m*-L corresponding to the bit position where l=L (the MSB position of data) outputs, as the real part bit-position-basis arithmetic result BRr #m-L, a result of the left-shifting by (L−Lc) bits for the inverting the sign of the element value LUTr #m-L selected by the real part LUT indexing circuit 203*m*-L. Likewise, the imaginary part bit-position-basis arithmetic circuit 208*m*-L corresponding to the bit position where l=L outputs, as the imaginary part bit-position-basis arithmetic result BRi #m-L, a result of the left-shifting by (L−Lc) bits for the inverting the sign of the element value LUTi #m-L selected by the imaginary part LUT indexing circuit 207*m*-L.

Also, when the bit position l corresponding to the real part bit-position-basis arithmetic circuit 205*m-l* is smaller than Lc (l=1, . . . , Lc−1), the real part bit-position-basis arithmetic circuit 205*m-l* outputs, as the real part bit-position-basis arithmetic result BRr #m-l, a result of performing (Lc−1)-bit right shift operation on the element value LUTr #m-l selected by the real part LUT indexing circuit 203*m-l* corresponding to the circuit. Similarly, when the bit position l corresponding to the imaginary part bit-position-basis arithmetic circuit 208*m-l* is smaller than Lc, the imaginary part bit-position-basis arithmetic circuit 208*m-l* outputs, as the imaginary part bit-position-basis arithmetic result BRi #m-l, a result of performing (Lc−1)-bit right shift operation on the element value LUTi #m-l selected by the imaginary part LUT indexing circuit 207*m-l* corresponding to the circuit.

Thee right shift operations are equivalent to dividing the element values LUTr #m-l and LUTi #m-l by $2^{(Lc-l)}$, and the (Lc−l) bit values on the LSB side before each right shift operation are not held by the circuit but are invalidated after the right shift operation. The process of this right shift operation is equal to rounding down the (Lc−l) bits on the LSB side of the element value LUTr #m-l or LUTi #m-l. FIG. 10 shows examples of the bit-position-basis arithmetic results BRr #m-(Lc−1) and BRr #m-1 when the bit position l is smaller than Lc.

Furthermore, the real part bit-position-basis arithmetic circuit 205*m*-Lc corresponding to the bit position where l=Lc performs no operation on the element value LUTr #m-Lc selected by the real part LUT indexing circuit 203*m*-Lc corresponding to the circuit, and directly outputs the element value LUTr #m-Lc as the real part bit-position-basis arithmetic result BRr #m-Lc. Likewise, the imaginary part bit-position-basis arithmetic circuit 208*m*-Lc corresponding to the bit position where l=Lc performs no operation on the element value LUTi #m-Lc selected by the imaginary part LUT indexing circuit 207*m*-Lc corresponding to the circuit, and directly outputs the element value LUTi #m-Lc as the imaginary part bit-position-basis arithmetic result BRi #m-Lc.

The real part summing circuit 206*m* sums up the real part bit-position-basis arithmetic results BRr #m-l (l=L) output from the real part bit-position-basis arithmetic circuits 205*m-l*, and outputs the sum $\Sigma_{l=1, \ldots, L}$(BRr #m-l) as y_real[m]. Similarly, the imaginary part summing circuit 209*m* sums up the imaginary part bit-position-basis arithmetic results BRi #m-l output from the imaginary part bit-position-basis arithmetic circuits 208*m-l*, and outputs the sum $\Sigma_{l=1, \ldots, L}$ (BRi #m-l) as y_imag[m].

In this embodiment, the left shift operation or the right shift operation having the number of bits that change in accordance with the bit position l is performed, so the bit-position-basis arithmetic results BRr #m-l and BRi #m-l have different bit widths.

Accordingly, the real part summing circuit 206*m* sums up the bit-position-basis arithmetic results BRr #m-l (l=L) after matching the bit widths of the bit-position-basis arithmetic results BRr #m-l to BRr #m-(L-1) with the maximum bit width, i.e., the bit width of the bit-position-basis arithmetic result BRr #m-L. Similarly, the imaginary part summing circuit 209*m* sums up the bit-position-basis arithmetic results BRi #m-l (l=L) after matching the bit widths of the bit-position-basis arithmetic results BRi #m-1 to BRi #m-(L-1) with the bit width of the bit-position-basis arithmetic result BRi #m-L.

Each of the bit-position-basis arithmetic results BRr #m-l and BRi #m-l is a two's-complement binary number expressing a signed fixed-point number. In the abovementioned bit width matching, therefore, bits having the same value as the sign bits must be added to the MSB side.

As described above, in the element values LUTr #m-l and LUTi #m-l (l=1, . . . , Lc-1) when the bit position 1 is smaller than Lc, (Lc-1) bit values on the LSB side are invalidated by the (Lc-l)-bit right shift operations by the bit-position-basis arithmetic circuits 205*m-l* and 208*m-l*. Also, in order for the LUT indexing circuits 203*m-l* and 207*m-l* to select one of four element values of the LUT, a 4-1 selector circuit for selecting one of four bit values is normally used for each bit position of the element value.

Accordingly, the circuit scale of the LUT indexing circuits 203*m-l* and 207*m-l* can be reduced by omitting the 4:1 selector circuit for the (Lc-1) bits on the LSB side, which are invalidated by the bit-position-basis arithmetic circuits 205*m-l* and 208*m-l*, of the bits of the element values LUTr #m-l and LUTi #m-l.

Note that when the bit-position-basis arithmetic circuits 205*m-l* and 208*m-l* perform the (L-1)-bit right shift operations on the element values LUTr #m-l and LUTi #m-l when the bit position is smaller than Lc (l=1, . . . , Lc-1), the bit-position-basis arithmetic results BRr #m-l and BRi #m-l may also be obtained by adding, to the abovementioned right shift operation results, the value of 1 bit on the MSB side of the (Lc-1) bits on the LSB side to be invalidated. This process is equal to rounding off the (Lc-1) bits on the LSB side of the element values LUTr #m-l and LUTi #m-l.

The values y_real[m] and y_imag[m] to be output from each of the distributed arithmetic circuits 2*a-m* are the results of product-sum arithmetic of the data x_real[m] and x_imag[m] and the complex number coefficient C. The number of decimal figures when the result of product-sum arithmetic is obtained by the conventional technique (arithmetic combining multiplication and addition) is the sum of the number x_scale of decimal figures of the data x_real[m] and x_imag[m] and the number c_scale of decimal figures of the complex number coefficient C, i.e., x_scale+c_scale. Also, when product-sum arithmetic is performed by normal distributed arithmetic (equivalent to the case in which the value of the parameter Lc is 1 in this embodiment), the number of decimal figures of the result of the product-sum arithmetic is x_scale+c_scale. On the other hand, in this embodiment, the (Lc-1) lower bits are invalidated as shown in FIG. 10. Accordingly, the number y_scale of decimal figures of the values y_real[m] and y_imag[m] to be output from each of the distributed arithmetic circuits 2*a-m* shortens by the number of invalidated bits, and becomes x_scale+ c_scale-Lc+1.

As described above, the arithmetic circuit of this embodiment is not a multiplication circuit for performing accurate multiplication on all bits, but performs distributed arithmetic that obtains the element values LUTr #m-l and LUTi #m-l from the LUT for each bit position l of data, invalidates lower bits predesignated in accordance with the bit position l, i.e., (Lc-1) lower bits in this embodiment, of the element values LUTr #m-l and LUTi #m-l, and accumulates the results.

Consequently, this embodiment requires no accumulation process for the invalidated bits when compared to the conventional arithmetic circuit that performs no invalidation, and can reduce the circuit area and the power consumption accordingly. Also, the invalidated lower bits contain a large noise component. Therefore, the lower bit invalidation of this embodiment does not degrade the accuracy of the value to be output from the arithmetic circuit, because the figure matching circuit 22*m* performs the round-off process or the round-down process in the conventional arithmetic circuit as well.

That is, the arithmetic circuit of this embodiment is not a multiplication circuit that performs accurate multiplication on all bits without distinguishing between upper bits and lower bits, but adopts distributed arithmetic that obtains the element value LUT #m-n'-l from the LUT for each bit position l of data and accumulates the values, thereby omitting the processing of lower bits predesignated for each bit position 1. Accordingly, the arithmetic circuit of this embodiment can effectively reduce the area and power of the circuit without deteriorating the arithmetic accuracy.

In particular, in order to increase the processing speed, the arithmetic circuit of this embodiment performs parallelization corresponding to the data bit width in order to simultaneously perform LUT search and accumulation for each bit position l of data in the distributed arithmetic circuits, and parallelization corresponding to the number of distributed arithmetic circuits in order to simultaneously perform distributed arithmetics on the M data sets. In the arithmetic circuit of this embodiment, therefore, the circuit scale required for the process of accumulating the abovementioned invalidated bits increases. This increases the effect of reducing the circuits by omitting the processing for the lower bits.

Note that each of the arithmetic circuits explained in the first and second embodiments can be implemented by, e.g., an FPGA (Field Programmable Gate Array).

Note that in the conventional product-sum arithmetic circuit, when the number of decimal figures of data is x_scale and the number of decimal figures of a coefficient is c_scale, the number of decimal figures of accurate product-sum arithmetic is x_scale+c_scale. Then, the figure matching circuit rounds the number of decimal figures to z_scale. Accordingly, x_scale+c_scale-z_scale is the number Lr of bits to be deleted by figure matching.

On the other hand, in the present invention, (Lc-1) bits are deleted more than the abovementioned accurate product-sum arithmetic value. To obtain a value that is almost the same as the accurate product-sum arithmetic value while reducing the circuit scale and the power consumption by the present invention, a value obtained by subtracting $\log_2(Lc)$ from the abovementioned Lr is made larger than the value of (Lc-1), i.e., Lc-1<Lr-$\log_2$(Lc) is set. For example, when L is 9 and all of x_scale, c_scale, and z_scale are 8, Lc is set at 5 or less.

The value of Lc is determined as described above because, in the present invention, LUT indexing results equal in number to the bit width L of data are summed up, and this summation accumulates the differences from the accurate product-sum arithmetic value, so it is necessary to prevent this accumulation of the differences from exerting a large influence on the rounded value.

INDUSTRIAL APPLICABILITY

The present invention is applicable to an arithmetic circuit.

EXPLANATION OF THE REFERENCE NUMERALS AND SIGNS 1, 1$a$ . . . LUT generation circuit, 2-1 to 2-M, 2$a$-1 to 2$a$-M . . . distributed arithmetic circuit, 3$a$-1 to 3$a$-M . . . figure matching circuit, 20$m$ . . . binomial distributed arithmetic circuit, 21$m$ . . . binomial distributed arithmetic result summing circuit, 22$m$ . . . figure matching circuit, 23$m$ . . . auxiliary multiplication circuit, 200$m$ . . . LUT indexing circuit, 201$m$ . . . bit-position-basis arithmetic circuit, 202$m$ . . . summing circuit, 203$m$ . . . real part LUT indexing circuit, 204 . . . sign inversion circuit, 205$m$ . . . real part bit-position-basis arithmetic circuit, 206$m$ . . . real part summing circuit, 207$m$ . . . imaginary part LUT indexing circuit, 208$m$ . . . imaginary part bit-position-basis arithmetic circuit, 209$m$ . . . imaginary part summing circuit

The invention claimed is:

1. An arithmetic circuit for performing product-sum arithmetic, which receives a data set X[m] (m=1, . . . , M) containing M (M is an integer of not less than 2) pairs of N (N is an integer of not less than 2) data x[m, n] (n=N) as fixed-point binary numbers, and N coefficients c[n] as fixed-point binary numbers, and calculates and outputs M product-sum arithmetic values z[m], the arithmetic circuit comprising:

a LUT generation circuit configured to, when the N coefficients c[n] are paired two by two, output a value calculated for each of the pairs; and M distributed arithmetic circuits configured to calculate and output, in parallel for each of the M pairs, the product-sum arithmetic values z[m]$\Sigma_{n=1, \ldots, N}$(c[n]×x[m, n]) that are sums of products of the N data x[m, n] of the data set X[m] and the N coefficients c[n], wherein each of the M distributed arithmetic circuits includes:

a plurality of binomial distributed arithmetic circuits configured to calculate and output, based on two data x[m, n] obtained by pairing the N data x[m, n] corresponding to the distributed arithmetic circuit two by two, on two coefficients c[n] obtained by pairing the N coefficients c[n] two by two, and on the value calculated by the LUT generation circuit, values of binomial product-sum arithmetic that are sums of products of the two data x[m, n] and the two coefficients c[n], in parallel for each pair of the two data x[m, n] and the two coefficients c[n];

a first summing circuit configured to sum up the values calculated by the plurality of binomial distributed arithmetic circuits; and a figure matching circuit configured to perform a process of matching a number of decimal figures in a result of summing up the values by the first summing circuit with a predetermined number of decimal figures smaller than the above number of decimal figures in the result, and outputs a processing result as the product-sum arithmetic values z[m], each of the plurality of binomial distributed arithmetic circuits includes:

a plurality of indexing circuits formed for each bit position of two values of the same pair of the N data x[m, n], and configured to obtain, for each bit position, one element value corresponding to two values in the same bit position, which form two values of the same pair of the N data x[m, n], from element values including 0, two values of the same pair of the N coefficients c[n], and a value calculated from the two values of the same pair of the N coefficients c[n] by the LUT generation circuit;

a plurality of bit-position-basis arithmetic circuits configured to perform bit-position-basis arithmetic on the element values obtained by the plurality of indexing circuits; and a second summing circuit configured to output a result of summing up values calculated by the plurality of bit-position-basis arithmetic circuits, as the binomial product-sum arithmetic value, and each of the plurality of bit-position-basis arithmetic circuits is configured to, when a bit position l corresponding to the bit-position-basis arithmetic circuit is smaller than a predetermined value Lc (Lc is an integer from 2 (inclusive) to L (exclusive)), invalidate (Lc−l) bits on a least significant bit side of an element value obtained by an indexing circuit corresponding to the bit-position-basis arithmetic circuit, of the plurality of indexing circuits.

2. The arithmetic circuit according to claim 1, wherein each of the plurality of bit-position-basis arithmetic circuits is configured to, when the bit position l corresponding to the bit-position-basis arithmetic circuit is larger than Lc, perform left shift operation of inserting (l−Lc) bits of 0s in a least significant bit side of the element value obtained by the indexing circuit corresponding to the bit-position-basis arithmetic circuit, each of the plurality of bit-position-basis arithmetic circuits is configured to, when the bit position l corresponding to the bit-position-basis arithmetic circuit is smaller than Lc, perform a right shift operation of shifting the element value obtained by the indexing circuit corresponding to the bit-position-basis arithmetic circuit to the right by (Lc−l) bits, and each of the plurality of bit-position-basis arithmetic circuits is configured to, when the bit position l corresponding to the bit-position-basis arithmetic circuit matches Lc, directly output the element value obtained by the indexing circuit corresponding to the bit-position-basis arithmetic circuit.

3. The arithmetic circuit according to claim 1, wherein the LUT generation circuit is configured to calculate, as a value d[n'], a sum c[2×n'−1]+c[2×n'] (n'=1, . . . , N') of values c[2×n'−1] and c[2×n'] obtained by pairing the N coefficients c[n] two by two, for each of N' (N' is a maximum integer that is not more than N/2), and each of the M distributed arithmetic circuits is configured to receive the data set X[m], the coefficients c[n] output from the LUT generation circuit, and the value d[n'] calculated by the LUT generation circuit, and to output the product-sum arithmetic values z[m] that are the sums of the products of the N data x[m, n], which correspond to the distributed arithmetic circuit, of the data set X[m] and the N coefficients c[n].

4. The arithmetic circuit according to claim 1, wherein each of the M distributed arithmetic circuits further includes an auxiliary multiplication circuit configured to calculate and output a value of c[N]×x[m, N] when N is an odd number, and when N is the odd number, the first summing circuit is configured to sum up the values calculated by the plurality of binomial distributed arithmetic circuits and the value calculated by the auxiliary multiplication circuit.

5. The arithmetic circuit according to claim 1, wherein the second summing circuit is configured to sum up the values calculated by the plurality of bit-position-basis arithmetic circuits after matching, with a bit width of a value calculated by a bit-position-basis arithmetic circuit, which corresponds to a most significant bit position, of the plurality of bit-position-basis arithmetic circuits, bit widths of values calculated by other bit-position-basis arithmetic circuits.

6. An arithmetic circuit for performing product-sum arithmetic, which receives M (M is an integer of not less than 2) complex numbers X[m] (m=M) each of which is divided into a real part value x_real[m] and an imaginary part value x_imag[m] (m=M), and a complex number coefficient C divided into a real part value c_real and an imaginary part value c_imag, and calculates and outputs M complex number values Z[m] containing a result of real part product-sum arithmetic and a result of imaginary part product-sum arithmetic, the arithmetic circuit comprising:

a LUT generation circuit configured to calculate a value d_sub of a difference between the real part value c_real and the imaginary part value c_imag of the complex number coefficient C, and a value d_add of a sum of the real part value c_real and the imaginary part value c_imag;

M distributed arithmetic circuits each of which is configured to calculate and output, in parallel, a complex number value Y[m] that is a sum of products of data, which correspond to the distributed arithmetic circuit, of the complex numbers X[m] and the complex number coefficient C; and M figure matching circuits configured to perform a process of matching each of a number of decimal figures of a real part product-sum arithmetic result y_real[m] and a number of decimal figures of an imaginary part product-sum arithmetic result y_imag[m], of the complex number values Y[m] output from the M distributed arithmetic circuits, with a predetermined number of decimal figures smaller than the numbers of decimal figures of real[m] and y_imag[m], and output the results of the process as z_real[m] and z_imag[m] forming the complex number values Z[m], wherein each of the M distributed arithmetic circuits includes:

a plurality of first indexing circuits formed for each bit position of the real part value x_real[m] and the imaginary part value [m] of the complex number X[m], and configured to obtain, for each bit position, one element value corresponding to two values, in a bit position corresponding to the distributed arithmetic circuit, of the real part value x_real[m] and the imaginary part value x_imag[m], from element values including 0, c_real, −c_imag, and d_sub;

a plurality of first bit-position-basis arithmetic circuits configured to perform bit-position-basis arithmetic on the element values obtained by the plurality of first indexing circuits;

a first summing circuit configured to output a result of summing up the values calculated by the plurality of first bit-position-basis arithmetic circuits, as the real part product-sum arithmetic value y_real[m];

a plurality of second indexing circuits formed for each bit position of the real part value x_real[m] and the imaginary part value [m] of the complex number X[m], and configured to obtain, for each bit position, one element value corresponding to two values, in a bit position corresponding to the distributed arithmetic circuit, of the real part value x_real[m] and the imaginary part value x_imag[m], from element values including 0, c_imag, c_real, and d_add;

a plurality of second bit-position-basis arithmetic circuits configured to perform bit-position-basis arithmetic on the element values obtained by the plurality of second indexing circuits; and a second summing circuit configured to output a result of summing up values calculated by the plurality of second bit-position-basis arithmetic circuits, as the imaginary part product-sum arithmetic value y_imag[m], the each of the M distributed arithmetic circuits is configured to calculate and output, in parallel, y_real[m] as the result of real part product-sum arithmetic c_real×x_real[m]−c_imag×x_imag[m], and y_imag[m] as the result of imaginary part product-sum arithmetic c_imag×x_real[m]+c_real×x_imag[m], each of the plurality of first bit-position-basis arithmetic circuits is configured to, when a bit position l corresponding to the first bit-position-basis arithmetic circuit is smaller than a predetermined value Lc (Lc is an integer from 2 (inclusive) to L (exclusive)), invalidate (Lc−l) bits on a least significant bit side of an element value obtained by a first indexing circuit, corresponding to the first bit-position-basis arithmetic circuit, of the plurality of first indexing circuits, and each of the plurality of second bit-position-basis arithmetic circuits is configured to, when a bit position l corresponding to the second bit-position-basis arithmetic circuit is smaller than Lc, invalidate (Lc−l) bits on a least significant bit side of an element value obtained by a second indexing circuit, corresponding to the second bit-position-basis arithmetic circuit, of the plurality of second indexing circuits.

7. The arithmetic circuit according to claim 6, wherein each of the plurality of first bit position-basis arithmetic circuits is configured to, when the bit position l corresponding to the first bit-position-basis arithmetic circuit is larger than Lc, perform a left shift operation of inserting (l−Lc) bits of 0s in the least significant bit side of the element value obtained by the first indexing circuit respectively corresponding to the first bit-position-basis arithmetic circuit, each of the plurality of first bit position-basis arithmetic circuits is configured to, when the bit position l corresponding to the first bit-position-basis arithmetic circuit is smaller than Lc, perform an (Lc−l)-bit right shift operation on the element value obtained by the first and second indexing circuit respectively corresponding to the first bit-position-basis arithmetic circuit, each of the plurality of first bit position-basis arithmetic circuits is configured to, when the bit position l corresponding to the first bit-position-basis arithmetic circuit matches Lc, directly output the element value obtained by the first and second indexing circuit corresponding to the first bit-position-basis arithmetic circuit, each of the plurality of second bit-position-basis arithmetic circuits is configured to, when the bit position l corresponding to the second bit-position-basis arithmetic circuit is larger than Lc, perform a left shift operation of inserting (l−Lc) bits of 0s in the least significant bit side of the element value obtained by the second indexing circuit corresponding to the second bit-position-basis arithmetic circuit, each of the plurality of second bit-position-basis arithmetic circuits is configured to, when the bit position l corresponding to the second bit-position-basis arithmetic circuit is smaller than Lc, perform an (Lc−l)-bit right shift operation on the element value obtained by the second indexing circuit corresponding to the second bit-position-basis arithmetic circuit, and each of the plurality of second bit-position-basis arithmetic circuits is configured to, when the bit position l corresponding to the second bit-position-basis arithmetic circuit matches Lc, directly output the element value obtained by the second indexing circuit corresponding to the second bit-position-basis arithmetic circuit.

8. The arithmetic circuit according to claim 6, wherein the first summing circuit is configured to sum up the values calculated by the plurality of first bit-position-basis arithmetic circuits after matching, with a bit width of a value calculated by a first bit-position-basis arithmetic circuit, which corresponds to a most significant bit position, of the plurality of first bit-position-basis arithmetic circuits, bit widths of values calculated by other first bit-position-basis arithmetic circuits, and the second summing circuit is configured to sum up the values calculated by the plurality of second bit-position-basis arithmetic circuits after matching, with a bit width of a value calculated by a second bit-position-basis arithmetic circuit, which corresponds to a most significant bit position, of the plurality of second bit-position-basis arithmetic circuits, bit widths of values calculated by other second bit-position-basis arithmetic circuits.

* * * * *